2,998,409
POLYOXYMETHYLENE CARBOXYLATES OF IMPROVED THERMAL STABILITY

Stephen Dal Nogare, West Chester, Pa., and John Oliver Punderson, Wilmington, Del., assignors to E. I. du Pont de Nemours and Company, Wilmington, Del., a corporation of Delaware
No Drawing. Filed Aug. 30, 1957, Ser. No. 681,188
12 Claims. (Cl. 260—67)

This invention relates to new compositions of matter and processes for preparing such compositions, and, more particularly, it relates to the preparation of novel polyoxymethylene carboxylates having a high degree of thermal stability.

This is a continuation-in-part of copending application Serial No. 443,702 filed by S. Dal Nogare and J. O. Punderson on July 15, 1954, now abandoned.

In U.S. Patent 2,768,994, issued October 30, 1956, there are described new high molecular weight polyoxymethylenes and processes for preparing such polymers. These polymers have been found to have a good thermal stability, and to be remarkably tough, even after periods of heating in the presence of air.

It has been known as reported in Walker's "Formaldehyde," 2d edition, Reinhold Publishing Corp. (1953), pages 133–137, that polyoxymethylene diacetates could be made by reacting formaldehyde or paraformaldehyde with acetic anhydride. The products, however, were low in molecular weight (degree of polymerization 7–70) and the thermal stability of the product became poorer and poorer as the molecular weight increased.

It has now been found that, by chemical treatment, the thermal stability of high molecular weight polyoxymethylenes, including those described in the above-cited patent and other copending applications, can be improved many fold, without sacrificing any of their toughness properties or other good physical properties. Such a combination of properties is highly attractive in the commercialization of polymeric materials because the polymer will respond to many fabrication methods without any undue yield losses.

It is an object of this invention to provide polyoxymethylene carboxylates having an improved thermal stability. It is a further object to provide thermally stable, high molecular weight polyoxymethylenes in which the polymer chains are terminated by carboxylic acid ester groups. It is another object of this invention to provide processes for the preparation of many highly desirable polyoxymethylene dicarboxylates.

The above objects are accomplished by reacting a polyoxymethylene having a number average molecular weight of at least 15,000 and having from 1–2 hydroxyls located at the terminal positions of each polymer chain with a carboxylic acid anhydride in the presence of a tertiary amine for a period of time sufficient to esterify substantially all of said hydroxyls, and recovering a polyoxymethylene carboxylate having a number average molecular weight of at least 15,000 and having a reaction rate constant for thermal degradation at 222° C. of less than 1% by weight per minute. In the preferred embodiment of this invention a polyoxymethylene glycol is treated by contacting it with a liquid phase or vapor phase mixture of a tertiary amine and an anhydride of an alkanoic acid having 2–18 carbon atoms per molecule and having at least one hydrogen atom attached to the carbon atom bonded to the carbonyl group of said acid until the terminal hydroxyl groups on the polyoxymethylene glycol are esterified. After this treatment, the thermal stability of the polymer is greatly improved as evidenced by negligible weight losses at high temperatures, and at the same time the other physical properties of the polymer have not been impaired.

In the description of this invention the property of thermal stability is defined by the value of the reaction rate constant for thermal degradation at some elevated temperature. The values of the reaction rate constant in this invention have been determined at 202° C. or at 222° C. It is well known that chemical reactions may be classed as first-order, second order, third-order, etc., depending on the number of molecules which enter into the reaction, or are formed by the reaction. It is therefore known that the decomposition or degradation of a material following a first-order reaction can be expressed mathematically in the form of the differential equation:

$$\frac{-dw}{dt} = kw$$

in which $t$ is the elapsed time from the beginning of the decomposition reaction, $w$ is the weight of the material which remains undecomposed at time $t$, and $k$ is a rate constant for the equation. The thermal degradation of the polyoxymethylenes of this invention has been found, with few exceptions, to conform closely to a first-order reaction which can be expressed by the above equation. The value of $k$ in this equation is utilized in the description of this invention to characterize a polymer with respect to its thermal stability. The desirable polymers are those having a value of $k$ for a thermal degradation reaction at 222° C. ($k_{222}$) of less than 1% per minute. This value of $k_{222}$ is for all practical purposes equivalent to a $k$ for a thermal degradation reaction at 202° C. ($k_{202}$) of about 0.4% per minute, or expressed in other words, the ratio of $k_{222}$ to $k_{202}$ is about 2.5 to 1.0. When $k_{222}$ is equal to 1%/min., it means that when the polymer is subjected to a temperature of 222° C. it will lose 1% of its weight per minute while being held at 222° C.

The value of the reaction rate constant for thermal degradation as reported herein is determined by placing about 1 gram of the polymer in a test tube which is then drawn down to form an ampule encasing the polymer and having a single capillary tip which is open to the atmosphere. The ampule is evacuated, filled with nitrogen, evacuated a second time, and filled with nitrogen a second time. The ampule is then suspended from a balance in a position such that the ampule may be subjected to a vapor bath at any desired temperature. In the determination of $k_{222}$, the ampule is maintained at 222°–223° C. by suspending it in a bath of methyl salicylate vapors (B.P. 222°–223° C.). In the determination of $k_{202}$, the ampule is maintained at 202° C. by suspending it in a bath of acetophenone vapors (B.P. 202° C.). As the polymer in the ampule degrades into formaldehyde vapors, the weight of the remaining solid polymer is recorded at periodic intervals, beginning at the moment the vapors (either methyl salicylate or acetophenone in the above description) reach the top of the ampule. These values are then plotted as the logarithm of the weight or weight percent of undegraded polymer as the ordinate versus the corresponding elapsed time since the beginning of degradation as the abscissa. The plotted values define a series of lines which are essentially straight throughout the major portion of the degradation period. In some instances, the initial degradation (from 100% undegraded polymer to some value between 90% and 100%), proceeds at a fast rate (5% to 10% or more per minute), after which the degradation rate assumes a constant value for a considerable portion of the degradation. This latter portion represents the true character of the polymer and is the basis for the reported value of the reaction rate constant, $k$. The graph therefore usually shows a first straight line portion having a very steep slope, from 100% to about 90% or 95% undegraded polymer, a second straight line portion having a shallower slope than the first portion, and extending from the end of the first straight line to some considerably lower value, e.g., from about 20% to about 50% remaining undegraded polymer; and finally a third straight line portion representing the remaining part of the degradation. The second straight line portion of the graph is the portion from which the value of the reaction rate constant, $k$, is determined, $k$ being 2.303 times the slope of that line. The units of $k$ are reported as weight percent per minute and therefore, if $k$ has an actual value of 0.01 it is reported as 1%/minute. It is to be understood that different lots of the same or different polymers may degrade in different manners such that the first straight line portion of the above-described graph may end at 95%, 90%, or 85%, while the second straight line portion of the graph may end at 60%, 40%, or 10%. Although these variations are known to occur, the second straight line portion is always clearly apparent from the graph so that the reaction rate constant is easily calculated by known means. In some rare instances the second portion of the graph is slightly curved rather than straight, the reason for which is unknown, but in such instances the graph is constructed by drawing the best straight line that will fit the plotted points and determining the $k$ from that straight line.

In the following examples, percentages and parts are by weight, and inherent viscosities are measured in dimethylformamide unless otherwise noted. The measurement is made at 150° C. in a solution containing 0.5 gram of polymer and 1 gram of diphenylamine per 100 ml. of dimethylformamide. As a comparison, the numerical value of inherent viscosity in dimethylformamide is approximately twice the numerical value of inherent viscosity measured at 60° C. in p-chlorophenol containing 2% of alpha-pinene. Two values of the reaction rate constant for thermal degradation are reported in the examples, $k_{202}$ and $k_{222}$, the former being the value when the degradation takes place at 202° C. and the latter being the value when the degradation takes place at 222° C. The correlation between these two values is that the numerical value of $k_{222}$ is equal to approximately 2.5 $k_{202}$.

It is recognized by those skilled in analytical chemistry that the measurement of number average molecular weight is difficult, and that the values determined by the measurement are not as precise as the results obtained in other areas of analytical chemistry. Even the most precise measurements by methods of osmometry are not sufficiently accurate to provide more than a range of molecular weights which may vary by several thousand in value from the upper to the lower limit of the range. In the description of this invention it is believed that the reported molecular weights are considerably more accurate for the lower molecular weights than for the higher molecular weights. Therefore, the lower value of a number average molecular weight of 15,000 is reasonably accurate, while the values of 50,000 to 100,000 or more are much less accurate. The inaccuracies in such measurements do not detract from the description of this invention, however, since skilled chemists recognize that such measurements are commonly employed to delineate low molecular weight polymers from high molecular weight polymers.

Number average molecular weight may be measured by the conventional procedures of osmometry where the polymer is sufficiently stable. Other methods which have been used for less stable materials in some of the following examples include measurements of inherent viscosity which are transposed by means of a correlation into molecular weight, and a determination of molecular weight by the use of an infrared analysis. The inherent viscosity procedure involves the establishment of a graphical or mathematical correlation of viscosity and molecular weight. Such a correlation has been found, by spot-checking with osmometry measurements to be within the limits of reasonable accuracy and to be extremely useful in determining molecular weights. In general, a correlation is required for each group of polymers made by the same polymerization catalyst.

Infrared analysis techniques are also satisfactory for measuring molecular weight. The oxymethylene content may be measured in infrared absorbance units, and, likewise, the hydroxyl content and/or the carbonyl content may be determined. By knowing the kind and the number of terminal groups on each polyoxymethylene chain, the infrared analysis permits a calculation of number average molecular weight. On polyoxymethylenes prepared in an aqueous or a hydrocarbon reaction medium, the number of terminal hydroxyl groups is two per molecular chain, and, on polyoxymethylenes prepared with an alcoholic reaction medium, the number of terminal hydroxyl groups is one per molecular chain. The number of carbonyl groups per molecular chain after treatment with an anhydride will be substantially the same as the number of hydroxyl groups per molecular chain before treatment. The only inherent difficulty with the infrared analysis of hydroxyl is that there is a background absorbance which masks the analysis of small concentrations of hydroxyl. Thus, in very high molecular weight polymer (about 100,000 or more) this procedure becomes somewhat inaccurate. On the other hand, the measurement of carbonyl by infrared analysis, is quite accurate because there is substantially no interference by background absorbance at this wave length. All infrared analyses in this invention were made on a Perkin-Elmer Model 21 Spectrophotometer fitted with a calcium fluoride prism. The analyses were made in the region of 2 to 8 microns wave length, the hydroxyl band appearing at 2.88 microns and the carbonyl band at 5.69 microns. A more complete description of the usual procedure for infrared analysis is given in Example 43 below.

The following examples serve to illustrate many features of this invention, but it is not intended that such examples will limit this invention in any way.

*Example 1*

Into a 500 ml. three-necked flask containing 100 ml. of acetic anhydride and 20 ml. of pyridine there was placed 5 grams of a high molecular weight polyoxymethylene having an inherent viscosity of 1.5 as measured in dimethylformamide. This measurement corresponds to a number average molecular weight of 50,000. The polyoxymethylene was made in a reaction medium of n-heptane employing a nickel carbonyl initiator and diphenylamine as an antioxidant according to the process described in U.S. Patent 2,734,889 issued February 14, 1956, to F. C. Starr, Jr. The mixture was stirred and heated while being protected from air by a slow stream of nitrogen. After one-half hour to one hour of heating at 130° C., the mixture was cooled and filtered. The product was washed once with acetone and several times with methanol, being careful to reslurry the precipitate with each wash liquid so as to thoroughly contact all of the precipitated polymer. It was dried by heating in a vacuum oven at about 60° C. for several hours. The weight, the inherent viscosity, and the molecular weight of the recovered polymer were essentially unchanged by the above treatment. Chemical analysis of the product for evidence of acetylation was successful by the use of very refined techniques in detecting the minute quantities involved, and infrared analysis showed that the hydroxyl band of the untreated polymer had disappeared after the above described treatment, and that a strong new band appeared which corresponded to the acetate carbonyl group. The thermal stability of the polymer was markedly improved by acetylation. The first-order rate constant, $k$, for the thermal decomposition of the product at 202° C. was less than 0.10%/min. as compared to 2.3%/min. for the untreated polymer.

When the procedure of Example 1 was repeated on several other samples of polyoxymethylene, the rate constants for the decomposition of the products at 202° C. ranged from 0.00% to 0.10%/min. as compared to 1.5 to 3.5%/min. for the untreated materials.

*Example 2*

The acetylation process was repeated as described in Example 1 on a polyoxymethylene having a number average molecular weight of 54,000 and an inherent viscosity of 1.6. The amount of pyridine was increased from 20 ml. to 50 ml. for 100 ml. of acetic anhydride. The thermal stability of the resulting product was essentially the same as that in Example 1.

*Example 3*

The acetylation process was repeated as in Example 1 on the same polymer as that described in Example 2. The amount of pyridine was decreased from 20 ml. to 5 ml. per 100 ml. of acetic anhydride. The results were essentially the same as that in Example 1.

*Example 4*

The procedure of Example 1 was repeated on the same polymer as that described in Example 2. The reaction mixture was heated at 100° C. instead of 130° C. The results were essentially the same except that the thermal stability was slightly lower, the first-order reaction rate contsant, $k$, being 0.12%/min. at 202° C.

*Examples 5 to 17*

In this series of examples, an acetylation treatment was performed on the polyoxymethylene which was in the form of a slurry in a hydrocarbon medium. The slurry in all cases was a mixture of 10 grams of polyoxymethylene in 200 ml. of the indicated hydrocarbon. Acetic anhydride and pyridine were added to the slurry in the amounts shown in Table I, and the total mixture was thoroughly agitated, either in a shaker tube or by refluxing the mixture. The polyoxymethylene used as a starting material was made according to the processes described in copending application Serial No. 365,278, filed by M. F. Bechtold and R. N. MacDonald on June 30, 1953, Patent No. 2,844,561, and in particular by using a reaction medium containing diphenylamine as an antioxidant and an 80:20 copolymer of lauryl methacrylate and beta-diethylaminoethyl methacrylate as an initiator. The number average molecular weight of the polyoxymethylene used as the starting material for all of the examples was 34,000. The inherent viscosities shown in Table I indicate that the molecular weight was not lowered by the acetylation treatment. Table I shows the results of this series of examples, including a control run of an untreated polymer. In this series of examples the reaction rate constant for thermal degradation was determined at 222° C.

*Example 18*

A solution was made by dissolving 5 grams of polyoxymethylene having a number average molecular weight of 70,000 and an inherent viscosity of 2.0 in a mixture of 100 ml. of dimethylformamide, 20 ml. of acetic anhydride, and 16 ml. of pyridine by heating and stirring at 140° C. After ½ hour at this temperature, the solution was cooled, causing the polymer to precipitate, after which the precipitated polymer was removed by filtration. After filtration the polymer was washed, dried and tested as described in Example 1. The recovery of acetylated polymer after washing and drying was 86%. The reaction rate constant, $k$, for thermal degradation at 202° C. was 0.00%/min. The polyoxymethylene which was used as a starting material was made by utilizing triphenylphosphine as a polymerization initiator in combination with diphenylamine as an antioxidant, according to the processes described in copending application Serial No. 365,235, filed by R. N. MacDonald on June 30, 1953, Patent No. 2,828,286. Prior to the acetylation treatment this polymer had a reaction rate constant for thermal degradation at 202° C. of 1%/min.

The procedure of this example was repeated on several other samples of polyoxymethylene, resulting in acetylation in each case. In each instance the reaction rate constant, $k$, for thermal degradation was less than 0.10%/min. at 202° C.

*Example 19*

The procedure of Example 18 was repeated except that only 2.5 ml. each of acetic anhydride and pyridine were used. The polyoxymethylene used as a starting material had an inherent viscosity of 1.6 and a number average molecular weight of 54,000. The product was acetylated and had a reaction rate constant, $k$, for thermal degradation of 0.18%/min. at 202° C.

*Example 20*

A solution was made of 5 grams of polyoxymethylene dissolved in a mixture of 150 ml. of gammabutyrolactone, 3 ml. of acetic anhydride and 3 ml. of pyridine. The polyoxymethylene employed as a starting material had an inherent viscosity of 2.0 and a number average molecular weight of 70,000. After heating the solution for one hour at 140° C., the solution was cooled and the precipitated polymer removed by filtration. The product was then worked up as described in Example 1. The product was acetylated and had a reaction rate constant, $k$, for thermal degradation at 202° C. of 0.08%/min.

*Examples 21 to 25*

In this series of examples other anhydrides were used in place of acetic anhydride to replace hydroxyl groups on the polyoxymethylene with ester groups. In each case

TABLE I

| Example | Slurry Medium | Ml. Acetic Anhydride per ml. Pyridine | Reaction Temp. (° C.) | Time of Heating (Hrs.) | Polymer Recovery (Percent) | Inherent Viscosity Measured in Dimethylformamide | Reaction Rate Constant, $k$, for Thermal Degradation at 222° C. (Percent/min.) |
|---|---|---|---|---|---|---|---|
| 5 | Control Sample, no acetylation treatment | | | | | 1.10 | 8.0 |
| 6 | Benzene | 20/2 | 83 | 3 | 93 | 1.16 | 0.28 |
| 7 | do | 20/16 | 85 | 3 | 99 | 1.10 | 0.22 |
| 8 | Xylene | 20/2 | 130–136 | 2½ | 88 | 1.31 | 0.12 |
| 9 | Benzene | 20/2 | 130–135 | 3 | 80 | | 0.10 |
| 10 | do | 5/2 | 130–135 | 3 | 63 | | 0.33 |
| 11 | Toluene | 20/2 | 110 | ½ | 95 | 1.13 | 0.41 |
| 12 | do | 20/2 | 110 | 3 | 94 | 1.17 | 0.26 |
| 13 | do | 20/16 | 110 | 3 | 93 | 1.16 | 0.18 |
| 14 | Cyclohexane | 20/16 | 82 | 3 | 100 | 1.23 | 0.88 |
| 15 | N-heptane | 20/16 | 97 | 3 | 100 | 1.20 | 0.22 |
| 16 | Benzene | 20/16 | 85 | 3 | 99 | | 0.22 |
| 17 | do | 20/2 | 130 | ½ | 91 | | 0.9 to 0.17 | listed in Table II below, 5 grams of polyoxymethylene was dissolved in a mixture of 100 ml. of purified dimethylformamide, 2 ml. of pyridine and 2 grams of the indicated anhydride. The solution was formed by heating the combination of ingredients until a clear solution was formed, the temperature being about 130° C. After the solution was heated at about 130° C. for ½ hour, it was cooled and 100 ml. of methanol added. The polymer precipitated from solution, was filtered, and washed with 200 ml. portions of methanol until the washings were free of acidity. The polymer was then dried for two hours in a vacuum oven at 90° C. and subjected to the already-described thermal treatment to determine the thermal stability of the polymer in terms of its reaction rate constant, $k$. The results of these tests are listed in Table II. The polyoxymethylene used as a starting material for this series of examples was made using triphenyl phosphine as an initiator and a reaction medium of n-heptane according to the general processess described in copending application Serial No. 365,235, filed by R. N. MacDonald on June 30, 1953, Patent No. 2,828,286. This starting material had an inherent viscosity of 1.6 and a number average molecular weight of 54,000.

TABLE II

| Example | Esterfication Agent | Over-all Polymer Recovery [1] Percent | Reaction Rate Constant, $k$, for Thermal Degradation at 202° C., percent min. |
|---|---|---|---|
| 21 | Control sample—no esterification | | 1.5 |
| 22 | 4-Phenyl benzoic anhydride | 60 | 0.9 |
| 23 | Benzoic anhydride | 62 | 0.12 |
| 24 | Stearic anhydride | 74 | 0.6 |
| 25 | Caproic anhydride | 44 | 0.9 |

[1] Polymer recoveries are approximate and are lower than the actual value because adhesion to walls of esterfication vessel prevented complete recovery.

*Example 26*

Using 10 grams of the same polyoxymethylene starting material as described in Examples 21 to 25, the polymer was dissolved in 300 ml. of dimethylformamide containing 40 ml. of propionic anhydride and 32 ml. of pyridine. The solution was heated at 140° C. to 145° C. for 30 minutes, after which the solution was cooled and the polymer recovered as described in Example 18. The polymer recovery was 84% and the reaction rate constant, $k$, for thermal degradation at 202° C. was found to be 0.17%/min.

*Example 27*

A slurry was made by mixing 10 grams of the polyoxymethylene of Example 21 with 100 ml. of propionic anhydride and 20 ml. of pyridine. The slurry was agitated in a shaker tube at 120° C. to 136° C. for 30 minutes. The polymer was recovered as described in Example 1, the recovery being 99% complete. The reaction rate constant, $k$, for thermal degradation at 202° C. was found to vary from 0.37%/min. at the beginning of the test to 0.09%/min. at the end of the test.

*Example 28*

A slurry was made of 10 grams of polyoxymethylene, made as described below, in a liquid mixture of 180 ml. of propionic anhydride and 40 ml. of pyridine. The slurry was agitated in a shaker tube at 120° C. to 135° C. for 30 minutes, after which the polymer was recovered essentially as described in Example 1. The polymer recovery was 96% complete and the polymer product was found to have a reaction rate constant, $k$, for thermal degradation at 202° C. which varied from 0.36%/min. initially to 0.02%/min. finally. The polymer used as a starting material in this example was made by a slurry polymerization process by introducing monomeric anhydrous formaldehyde into an agitated reaction medium consisting of 40 pounds of n-heptane as a reaction medium, containing as a polymerization initiator a combination of 0.20 gram of nickel carbonyl and 1.11 grams of diphenylamine. The reaction was carried out at a temperature of 21° C. to 26° C., with an agitator speed of 290–310 r.p.m. over a period of 90 minutes. Monomer was prepared by the pyrolysis of paraformaldehyde. The reaction rate constant, $k$, for thermal degradation of this untreated polymer was found to be 2.3%/min. at 202°C. The inherent viscosity of the untreated polymer was 1.5 as measured in dimethylformamide.

*Examples 29 to 33*

In this series of examples, 25 grams of polyoxymethylene (essentially the same as that used as a starting material in Examples 5 to 17) was mixed with 500 ml. of acetic anhydride and the amounts indicated below of diethylcyclohexylamine to form a slurry. In each case the slurry was stirred and refluxed at about 140° C. for two hours. The polymer was then removed by filtration and washed three times with acetone. The results of the experiments are listed in Table III. The untreated polymer had a reaction rate constant, $k$, for thermal degradation at 222° C. of 0.65%/min.

TABLE III

| Example | Amount of Diethylcyclohexylamine (ml.) | Recovery (Percent) | Reaction Rate Constant, $k$, for Thermal Degradation at 222° C. (Percent/minute) |
|---|---|---|---|
| 30 | 1.5 | 78 | 0.10 |
| 31 | 3.0 | 76 | 0.06 |
| 32 | 7.5 | 78 | 0.14 |
| 33 | 15.0 | 82 | 0.09 |
| 34 | 30.0 | 82 | 0.09 |

As a comparison, the same procedure was followed on the same polymer, using 2.5 ml. of pyridine in place of the diethylcyclohexylamine. The polymer recovery was 85% complete and the polymer produced had a reaction rate constant, $k$, for thermal degradation at 222° C. of 0.17%/min.

*Example 34*

A slurry was made of 10 grams of polyoxymethylene, 200 ml. of acetic anhydride, and 66 ml. of quinoline. The polyoxymethylene used as a starting material was a blend of two batches of polymer made by using triphenyl phosphine as an initiator according to the processes described in copending application Serial No. 365,235, filed by R. N. MacDonald on June 30, 1953, Patent No. 2,828,286. The starting material had a reaction rate constant, $k$, for thermal degradation at 202° C. of 0.84%/min., an inherent viscosity of 2.17 and a number average molecular weight of 77,000. The slurry was heated at 130° C. for one hour, after which the polymer was recovered as described in Example 1. The polymer recovery was 91% complete and the polymer product was found to have a reaction rate constant, $k$, for thermal degradation at 202° C. of 0.38%/min.

*Example 35*

A slurry was made of 10 grams of the same polyoxymethylene used as the starting material in Example 34, 200 ml. of acetic anhydride, and 50 ml. of N-methyl morpholine. The slurry was heated at 126° C. for one hour and the polymer was recovered as described in Example 1. The polymer recovery was 95% complete and the polymer product was found to have a reaction rate constant, $k$, for thermal degradation at 202° C. of 0.58%/min.

*Example 36*

A solution was made by dissolving 5 grams of polyoxymethylene, described below, in 150 ml. of gammabutyrolactone containing 3 ml. of acetic anhydride and 3 ml. of triethylamine. The polyoxymethylene used as the starting material herein was made by utilizing triphenyl phosphine as an initiator in combination with diphenylamine as an antioxidant in the processes described in copending application Serial No. 365,235, filed by R. N. MacDonald on June 30, 1953, Patent No. 2,828,286. This starting material had an inherent viscosity of 2.0 and a number average molecular weight of 70,000. The solution was heated at 140° C. for one hour and the polymer recovered in the manner described in Example 18. The polymer recovery was 54% complete and the polymer product was found to have a reaction rate constant, $k$, for thermal degradation at 202° C. which varied from 0.13%/min. to 0.03%/min. as compared with a constant, $k$, for the starting material of 1.0%/min.

*Example 37*

A solution was made of 10 grams of the same polyoxymethylene used as a starting material in Examples 21 to 25, 200 ml. of dimethylformamide, 60 ml. of dimethylaniline, and 50 ml. of acetic anhydride. The solution was heated at 133° C. for one hour, after which the polymer was recovered as described in Example 18. The polymer recovery was 91% complete, and the polymer product was found to have a reaction rate constant, $k$, for thermal degradation at 202° C. which varied from 0.54%/min. initially to 0.12%/min. finally.

*Example 38*

A slurry was made of 10 grams of the polyoxymethylene used as a starting material in Examples 21 to 25, 200 ml. of acetic anhydride, and 60 ml. of dimethylaniline. The slurry was stirred and heated to 130° C. and allowed to cool slowly to room temperature. The polymer was then recovered in the manner described in Example 1. The polymer recovery was 77% complete and the polymer product was found to have a reaction rate constant, $k$, for thermal degradation at 202° C. which varied from 0.68%/min. to 0.11%/min.

*Example 39*

A slurry was formed as described in Example 38, using the same starting material as described in Example 28. The slurry was agitated for two hours at 130° C., after which the polymer was recovered. The polymer recovery was 81% complete and the product was found to have a reaction rate constant, $k$, for thermal degradation at 202° C. of 0.37%/min.

*Example 40*

For the acetylation of dry polymer with vapors of acetic anhydride and pyridine 10 grams of dry powdered polyoxymethylene (the same as that used for a starting material in Examples 5 to 17) was placed in a glass vessel having a porous fritted glass bottom. Nitrogen gas was passed slowly through the vessel, entering by way of the porous bottom and leaving through an opening at the top. The vessel was then heated to 150° C., and a stream of acetic anhydride and pyridine vapors (generated by flash distillation of an 80:20 volume ratio mixture of acetic anhydride and pyridine) was combined with the nitrogen stream entering the vessel. During one hour of operation 40 ml. of the liquid acetic anhydride-pyridine mixture was added to the vapor generator. Almost all of this material was recovered by condensing the vapors after they had passed through the polymer reaction vessel. The polymer remained as a dry powder throughout this vapor treatment at 150° C.

The nitrogen stream was maintained while the reaction vessel was cooled to room temperature. The polymer was removed and thoroughly washed with several portions of methanol and water, followed by drying in a vacuum oven for 5 hours at 70° C. The acetylated product (8.5 grams, 85% recovery) showed greatly improved thermal stability as evidenced by a reaction rate constant for thermal degradation at 222° C., $k_{222}$, which ranged from 0.41%/min. to 0.18%/min. as compared to 8%/min. for the untreated polymer. Infrared analysis showed that the strong hydroxyl band of the untreated polymer almost completely disappeared during acetylation, and a new band typical of acetate carbonyl appeared. The number average molecular weight and the inherent viscosity of the polymer in dimethylformamide were not appreciably changed by the acetylation.

A 2 gram portion of the acetylated product was compression molded between polished metal plates for 1 minute at about 200° C. A translucent film of excellent strength and toughness was produced.

*Example 41*

The procedure of Example 40 was repeated except that 15 grams of the starting polymer was used and the acetylating vapor was acetic anhydride only (no pyridine or other catalyst was included). During 1½ hours of operation 150 ml. of liquid acetic anyhydride was vaporized in the vapor generator and passed through the reaction vessel at 150° C. The product was cooled to room temperature in a stream of nitrogen and removed as a dry powder (12.0 grams, 80% recovery). No further washing or drying treatment was used, and the $k_{222}$ value ranged from 0.46 to 0.32%/min. as compared to 8%/min. for the untreated polymer.

*Example 42*

Polyoxymethylene was prepared as described in Examples 5 to 17 using a hydrocarbon reaction medium containing diphenylamine as an antioxidant and an 80:20 copolymer of lauryl methacrylate and beta-diethylaminoethylmethacrylate as an initiator. The polyoxymethylene was then slurried in a mixture of 10 yarts acetic anhydride, 2 parts pyridine, and 1 part polymer. This slurry was refluxed for two hours at 130° C. and the resulting slurry was filtered and the solid particulate product was dried. The product was acetylated by the above treatment and found to have an inherent viscosity in dimethylformamide of 0.7 and a number average molecular weight of 20,000. The reaction rate constant for thermal degradation at 222° C. ($k_{222}$) was 0.10%/min. By measurement in a rheometer the melt viscosity was found to be 4300 poises at 5 minutes hold-up time and 4000 poises at 10 minutes hold-up time. The product was then melt spun at 190° C. into a fiber and drawn 8.6 times at 168° C. The fiber was a 15 denier yarn and it exhibited the following properties: tenacity 6.1 grams per denier; elongation 13%, and modulus 67 grams per denier.

*Example 43*

In order to show that the polyoxymethylenes of this invention are actually esterified, and that some other phenomenon has not been the cause of the increased stability, experiments were run in which polymers were acetylated with acetic anhydride made from a radioactive isotope of carbon having an atomic weight of 14, and the resulting polymers analyzed by radio activity measurements, by chemical analysis, and by infrared analysis. One such experiment was performed as follows.

A polyoxymethylene was prepared by polymerization of monomeric formaldehyde in a reaction medium comprising n-heptane, triphenyl phosphine, and diphenylamine in the approximate weight proportions of 10,000:.081:.1 respectively. The polymerization procedure employed is that described in copending application Serial No. 365,235 filed by R. N. MacDonald on June 30, 1953, Patent No. 2,828,286.

Eleven grams of this polymer was then slurried with 100 ml. of acetic anhydride, made of radioactive carbon-14, and 25 ml. of pyridine. This slurry was refluxed and stirred for one hour at about 133° C. The product was then filtered, washed thoroughly with successive acetone washes, and dried in a vacuum oven at 60° C. for several hours.

Standard microcombustions were then run on portions of the dried product, and the carbon dioxide which formed as a combustion product was absorbed in sodium hydroxide solution. (The type of absorber used and the procedure employed is described on page 83 of "Isotopic Carbon" by Calvin et al., published in 1949 by John Wiley and Sons, Inc.) A suitable amount of carrier in the form of sodium carbonate was added to the sodium hydroxide solution and the total carbonate was precipitated as barium carbonate. (The procedure used is that described on pages 84–88 of the above cited article.) Activity measurements were made on suitably prepared aliquot portions of the barium carbonate samples using a windowless, gas-flow type of counter. From these values the relative activity of the acetylated polymer sample with respect to the activity of the acetic anhydride can be determined, and from the relative activity the acetyl content was calculated to be 0.29 moles of acetate per 100 moles of oxymethylene units in the polymer. This analysis is equivalent to 2 acetate groups per polymer chain averaging 690 oxymethylene units in length, or a number average molecular weight of about 21,000.

A chemical analysis of the above polymer (acetylated with radioactive acetic anhydride) was performed by depolymerizing a portion of the polymer in methanolic hydrogen chloride, adding caustic and saponifying at a pH of 9–10, acidifying the solution with dilute hydrogen chloride to a pH of 3, and titrating, potentiometrically, with 0.02 N sodium hydroxide to determine the acetic acid content, from which the acetate content of the original polymer is calculated. From such an analysis, it was determined that the acetate content was 0.30 mole of acetate per 100 moles of oxymethylene units in the polymer. This analysis is equivalent to 2 acetate groups per polymer chain averaging 667 oxymethylene units in length, or a number average molecular weight of about 20,000.

As a third check, this polymer was analyzed, before and after acetylation, by infrared absorption techniques to determine the hydroxyl and acetate carbonyl contents of each polymer. A standard commercial infrared spectrophotometer operating on the double beam null principle is used for this analysis. The instrument used in this example was a Perkin-Elmer Model 21 Infrared Spectrophotometer fitted with a calcium fluoride prism and operated under the following conditions:

| Gain | —as required |
| Resolution Schedule | —975 |
| Suppression | —2 |
| Scanning Rate | —3 minutes per micron |
| Scale | —4 inches per micron |

A skilled infrared spectroscopist can perform this analysis on any equivalent instrument. The analyses were made in the region of 2 to 8 microns wave length, the hydroxyl band being at a wave length of 2.88 microns and the acetate carbonyl band being at a wave length of 5.69 microns. The analysis was made on a film formed by pressing about 0.1 gram of powdered polymer between flat platens at room temperature and with sufficient pressure (as high as 300,000 p.s.i. may be required) to produce a film having a reasonable degree of translucency. The film was approximately 0.15 mm. in thickness. A section of this film which is clear and free of cracks and holes was mounted in the infrared instrument using a micro-sample holder with an opening of ⅛ inch x ⅝ inch.

Although the films obtained from various samples were not always of exactly the same thickness, errors due to variations in thickness were eliminated by expressing the hydroxyl and carbonyl absorbance values in relation to a standard absorbance of the same sample at a wave length of 4.32 microns. The absorbance at 4.32 microns was found to vary directly with the film thicknesses of different samples, but to be essentially unaffected by the presence or absence of hydroxyl or acetate carbonyl in the samples. The amount of hydroxyl in a given sample was calculated as follows:

Relative absorbance units of hydroxyl $$=\frac{\text{Absorbance at 2.88 microns}}{\text{Absorbance at 4.32 microns}}$$

Similarly, the amount of carbonyl in a given sample was calculated as follows:

Relative absorbance units of carbonyl $$=\frac{\text{Absorbance at 5.69 microns}}{\text{Absorbance at 4.32 microns}}$$

The results obtained for the polymer of this example were:

| | Relative Absorbance Units | |
| --- | --- | --- |
| | Hydroxyl Band at Wave Length 2.88 microns | Carbonyl Band at Wave Length 5.69 microns |
| Polymer before acetylation | 0.57 | not detectable. |
| Polymer after acetylation | less than 0.09 | 2.18. |

The reading of less than 0.09 absorbance unit in the hydroxyl band of the acetylated polymer represents a background absorption which prevents the measurement of less than about 0.09 absorbance unit in the hydroxyl band. By comparison with infrared spectra of other organic compounds of known acetate carbonyl content, 2.18 absorbance units in the acetylated polymer indicates an analysis of 0.29 mole of acetate per 100 miles of oxymethylene units in the analyzed polymer. This analysis is equivalent to 2 acetate groups per polymer chain averaging 690 oxymethylene units in length, or a number average molecular weight of about 21,000.

*Example 44*

A polyoxymethylene having a number average molecular weight of 16,000 was employed as the starting material for this example. The polyoxymethylene starting material for this example was prepared by the procedures of copending Application Serial No. 700,359 filed by N. Brown, D. L. Funck, and C. E. Schweitzer on December 3, 1957. Into a pressure bottle there was placed 5 grams of the starting material polymer, 230 ml. of refined acetic anhydride, and 20 ml. of pyridine. After the bottle was purged with dry nitrogen gas for 30 minutes, the bottle was closed and pressurized with nitrogen. The bottle and its contents were heated to 164° C., which was sufficiently high to dissolve the polymer, and then the mixture was cooled to room temperature. The precipitated polymer was filtered, washed with acetone, washed with water, and washed with acetone in that order, and finally dried under vacuum at 70° C. The recovery of polymer was 98.8% by weight. The product was a polyoxymethylene diacetate having a number average molecular weight of 16,000 and having a reaction rate constant for thermal degradation at 222° C. of less than 0.04% by weight per minute.

*Example 45*

In an experiment similar in all aspects of process to that of Example 44, a polyoxymethylene starting material having a number average molecular weight of 24,000 by infrared analysis was acetylated into a polyoxymethylene diacetate having a reaction rate constant for thermal degradation at 222° C. of 0.04% by weight per minute. The number average molecular weight of the polyoxymethylene diacetate as determined by infrared analysis of the acetate carbonyl band was 19,000, and, as determined by conventional methods of osmometry, was 22,000.

The process of this invention contemplates the preparation of polyoxymethylene carboxylates with a high degree of thermal stability. It is already known that high molecular weight polyoxymethylenes can be made that have exceptional toughness characteristics, and in many cases, a good thermal stability; however, it is highly desirable that processes be available for improving that thermal stability so that polymers of the highest quality may be prepared. It is also highly desirable to be able to employ the process of this invention to transform polyoxymethylenes with poor thermal stability into polyoxymethylene carboxylates with excellent thermal stability. The polymer compositions of this invention possess a heretofore unattained stability to the action of heat at about 200° C. to 250° C. and therefore are very well adapted for the fabrication methods known today, such as injection molding, milling, compression molding, calendering, casting, spinning, and others known to those skilled in the art.

The esterification is accomplished by the action of carboxylic acid anhydrides on the hydroxyl groups, present as alcoholic hydroxyl or hemiformal hydroxyl, which terminate the polymer chain on the polyoxymethylene used as a starting material. The polyoxymethylene starting material may be any of the products described in U.S. Patent 2,768,994 issued October 30, 1956, to R. N. MacDonald or in U.S. Patent 2,734,889 issued on February 14, 1956, to F. C. Starr. Furthermore, the starting material may be that made by any of the processes of the following copending applications: Serial No. 365,278 filed by R. N. MacDonald and M. F. Bechtold on June 30, 1953, Patent No. 2,844,561; Serial Nos. 365,234 and 365,235, both filed by R. N. MacDonald on June 30, 1953, Patent Nos. 2,841,570 and 2,828,286, respectively; Serial No. 785,135 filed by H. H. Goodman and L. T. Sherwood on January 6, 1959; and Serial No. 423,855 filed by W. P. Langsdorf and G. S. Stamatoff on April 16, 1954, Patent No. 2,848,437. The only limitations on the starting material, however, are that it is a polyoxymethylene having a number average molecular weight of at least 15,000 and having 1-2 hydroxyls located at the terminal positions of each polymer chain in the polyoxymethylene. If the starting material is polyoxymethylene glycol, it has 2 hydroxyls per polymer chain. There are other polyoxymethylenes which have one end of the polymer chain terminated with a hydroxyl group, while the other end of the chain is terminated with a non-esterifiable group, such as a carboxylate or an alkoxy group.

The products of this invention are called polyoxymethylene carboxylates generally, or polyoxymethylene dicarboxylates more specifically. The formula for these products is:

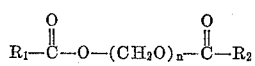

wherein $R_1$ and $R_2$ are selected from the group consisting of alkyl, alkylene, cycloalkyl, and aryl, and $n$ is an integer greater 500. The starting material for the process of this invention is a polyoxymethylene having 1-2 hydroxyls located at the terminal positions of the polymer chains, and thus has the formula:

wherein $n$ is an integer greater than 500, and Z is hydrogen (when the polyoxymethylene has 2 terminal hydroxyls) or some other composition, such as alkyl, aryl, or acyl (when the polyoxymethylene has only 1 terminal hydroxyl). It may be seen that the terminal hydroxyls are esterified by the process of this invention to produce the product represented by the first-mentioned formula above. The length of the polymer chain of $CH_2O$ units is designated as 500 so as to provide for a number average molecular weight of at least 15,000, which has been found to be sufficient to provide sufficient good physical properties of strength, toughness, and stiffness for most fabrication methods known today. There may be polyoxymethylene carboxylates in which not every polymer chain in the polymer is completely esterified; that is, one of the two terminal hydroxyls might not have reacted. Such a product is intended to be included in this invention if substantially all of the terminal hydroxyls are replaced by carboxylate groups. In general, the process of this invention is capable of producing 95%–100% completion of the esterification reaction within a reasonable time, although because of the tangled nature of polymer chains there may be some polyoxymethylene carboxylates with 1%–2% of the terminal hydroxyls remaining. The term "polyoxymethylene dicarboxylates" is intended to include these products which may contain a negligible number of unreacted hydroxyls.

It has been found that the polyoxymethylenes containing terminal hydroxyl groups, whether they are alcoholic hydroxyl groups or hemiformal hydroxyl groups, may be modified into products of improved thermal stability by the action of a carboxylic acid anhydride and a tertiary amine. In general, any organic carboxylic acid anhydride is operable in this invention, although the monofunctional anhydrides are preferred. Included in these acid anhydrides are the anhydrides of any aliphatic acid such as acetic, propionic, butyric, caproic, decanoic, stearic, cyclohexanecarboxylic, maleic, oleic, acrylic, linoleic, succinic, and others, as well as the aromatic acids, such as benzoic acid and phthalic acid. Derivatives of the above acid anhydrides may be employed, particularly alkyl- or aryl-substituted acid anhydrides, an example of which is 4-phenyl benzoic acid anhydride utilized in Example 22. Mixed anhydrides may be employed in the processes of this invention, such as acetic propionic anhydride. In general, the non-olefinic acid anhydrides are preferred to the olefinic anhydrides and the most preferable anhydrides are the alkanoic acids containing 2-18 carbon atoms per molecule and having at least one hydrogen atom attached to the carbon which is bonded to the carbonyl in said acid. Acetic anhydride is highly desirable because of its availability and low cost.

Although it is possible to achieve esterification by omitting the tertiary amine catalyst from the reactions described herein, it has been found that the incorporation of such a catalyst into the reaction medium is desirable in order to obtain higher yields and better thermal stabilities than would normally be obtained without that catalyst. The tertiary amine used in conjunction with any of the above anhydrides is believed to perform a double function by being a catalyst for the esterification process and at the same time acting as an acid acceptor for any acid formed from the anhydride or from some other source. Among the tertiary amines which may be used in the process of this invention are quinoline, pyridine, methylethylpyridine, dimethylaniline, n-phenylmorpholine, diethylcyclohexylamine, dimethylcyclohexylamine, trimethylamine and triethylamine. Pyridine is the preferred catalyst.

The process conditions for accomplishing esterification of the terminal hydroxyls of polyoxymethylenes are not restrictive, but, on the contrary, a wide variety of conditions may be used in the different embodiments of this process. For instance, the examples illustrate the fact that the esterification of polyoxymethylene can be accomplished in any compatible medium in which the polymer can be intimately contacted with the desired carboxylic acid anhydride. As illustrated, the medium may be a non-degrading solvent for polyoxymethylene, or it may be a non-solvent which forms a slurry with polyoxymethylene particles, or the esterifying reagents may be in the vapor phase while the polyoxymethylene is present as a solid. Non-solvents for polyoxymethylene include the anhydrides which enter into the esterification reaction as well as hydrocarbons such as heptane, hexane, cyclohexane, toluene, benzene, xylene, and others which are familiar to skilled chemists.

The temperature and duration of the esterification medium are not critical. For economical reasons, the temperature should not be too high in the solution-type or the slurry-type process, since pressure vessels may be required to prevent the liquids in the reaction medium from vaporizing, although the process of the invention is operable under pressure. The duration of the reaction is not limited by any peculiarities of this process other than the normal requirements of allowing time for the reaction to occur and to approach as near as feasible to completion of the reaction. This time may be a fraction of an hour or may be two or three hours, depending on the temperature of the reaction, concentration of reactants, the efficiency with which one reactant contacts another, the presence of a catalyst, and other features of reaction kinetics well understood by those skilled in the art. In general, temperatures of 50° to 200° C. combined with reaction times of about 5 minutes to about 3 hours are sufficient to encompass the normal processes of this invention.

The proportional amounts of the various ingredients in the reaction are not critical although there are preferred limits which have been found to be desirable. For convenience in handling, it is preferred in the liquid phase reaction to have 100 to 200 ml. of reaction medium for every 5 to 10 grams of polyoxymethylene to be treated. In the case of forming a slurry of polyoxymethylene, the above ratios are desirable with ordinary stirring techniques, but higher polymer contents may be handled with more efficient stirring mechanisms.

The amount of anhydride which is employed is preferably a large excess over that theoretically needed to complete the reaction, although such an amount is desirable primarily for purposes of minimizing the reaction time. In general, the amount of anhydride which may be employed is at least 1,000 mols of anhydride per hydroxyl group terminating the polymer chain. Typical reactions employ 2,000–3,000 mols of anhydride per terminal hydroxyl. For most embodiments of this invention such a molar ratio may be encountered by employing 10–20 parts by weight of anhydride for every part of polymer. Vapor phase reactions usually require from 100 to 1,000 mols of anhydride per terminal hydroxyl, and the preferred amount expressed in weight proportions is 0.1–10 parts of anhydride per part of polymer.

When a catalyst is used it may be present from 1 mol percent to 100 mol percent of the anhydride, although these limits are not critical, but rather are desirable. In order to obtain a reasonable speed for the reaction, the amount of tertiary amine catalyst should preferably be not less than about 10 mol percent and not more than about 75 mol percent of the anhydride present.

The polyoxymethylene carboxylates of this invention have essentially the same chemical properties and the same physical properties (with the exception of their improved thermal stability) as polyoxymethylenes made by any of the processes described in the patents and copending applications cited herein. The paramount difference is that the replacement of terminal hydroxyl groups by carboxylate groups materially improves the thermal stability of the polymer to such an extent that the polymers of this invention are eminently better suited for use in fabrication methods at high temperatures than are the polyoxymethylenes containing terminal hydroxyl groups. The number of carboxylate groups varies with the polymer which is treated, although it is never more than two groups per polymer chain since these groups form the terminals of the polymer chain. The number of carboxylate groups may be so small in the case of an extremely high molecular weight polymer that they are difficult to detect by infrared analysis, although in the majority of cases the number of acyl groups is detectable by both infrared analysis and refined techniques of chemical analysis.

The polyoxymethylene carboxylates of this invention are highly desirable for the preparation of films, sheets, funicular structures such as fibers, filaments, bristles, rods, and tubes, and molding powders, and any general use of a thermoplastic polymer which is tough and has good thermal stability.

We claim:
1. A polyoxymethylene carboxylate having a reaction rate constant for thermal degradation at 222° C. of less than 1% by weight per minute, substantially all of the polymer chains of said polyoxymethylene carboxylate having the structural formula:

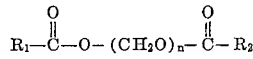

wherein $R_1$ and $R_2$ are organic radicals having 1–17 carbon atoms and are selected from the group consisting of alkyl, alkylene, cycloalkyl, and aryl, and $n$ is an integer greater than 500.

2. A polyoxymethylene carboxylate having a reaction rate constant for thermal degradation at 222° C. of less than 0.5% by weight per minute, substantially all of the polymer chains of said polyoxymethylene carboxylate having the structural formula:

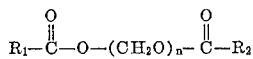

wherein $R_1$ and $R_2$ are organic radicals having 1–17 carbon atoms and are selected from the group consisting of alkyl, alkylene, cycloalkyl, and aryl, and $n$ is an integer greater than 500.

3. A polyoxymethylene carboxylate having a reaction rate constant for thermal degradation at 222° C. of less than 0.5% by weight per minute, substantially all of the polymer chains of said polyoxymethylene carboxylate having the structural formula:

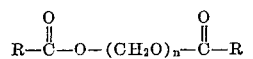

where R is an alkyl having 1–17 carbon atoms and the carbon in said R which is attached to the carbonyl group has at least one hydrogen atom attached thereto, and $n$ is an integer greater than 500.

4. A polyoxymethylene diacetate having a number average molecular weight of at least 15,000 and having a reaction rate constant for thermal degradation at 222° C. of less than 1% by weight per minute.

5. A film comprising the polyoxymethylene carboxylate of claim 1.

6. A funicular structure comprising the polyoxymethylene carboxylate of claim 1.

7. A process for preparing a polyoxymethylene carboxylate having a high degree of thermal stability comprising subjecting a reaction mixture of a polyoxymethylene, having a number average molecular weight of at least 15,000 and being characterized by the presence of 1–2 hydroxyls located at the terminal positions of each polymer chain, 0.1 to 20 parts by weight of a carboxylic acid anhydride per part of said polyoxymethylene, and 1–100 mol percent, based on said anhydride, of a tertiary amine to a temperature of 50°–200° C. for a time sufficient to esterify substantially all of said hydroxyls, and recovering a polyoxymethylene carboxylate having a number average molecular weight of at least 15,000 and having a reaction rate constant for thermal degradation at 222° C. of less than 1% by weight per minute.

8. The process of claim 7 in which said polyoxymethylene is in solution while being reacted with said anhydride.

9. The process of claim 7 in which said polyoxymethylene is in the form of a finely divided powder dispersed in a liquid reaction medium comprising said anhydride.

10. The process of claim 7 in which said anhydride and said amine are in the vapor phase and said polyoxymethylene is in the solid phase.

11. A process for the preparation of a polyoxymethylene dicarboxylate having a high degree of thermal stability comprising subjecting a reaction mixture of a polyoxymethylene glycol having a number average molecular weight of at least 15,000, 0.1 to 20 parts by weight per part of said polyoxymethylene glycol of an anhydride of an alkanoic acid having 2–18 carbon atoms per molecule and having at least one hydrogen atom attached to the carbon which is bonded to the carbonyl group in said acid, and 10 mol percent to 75 mol percent, based on said anhydride, of a tertiary amine to a temperature of 50°–200° C. for a reaction time sufficient to esterify substantially all of the hydroxyl groups in said polyoxymethylene glycol, and recovering a polyoxymethylene dicarboxylate having a number average molecular weight of at least 15,000 and a reaction rate constant for thermal degradation at 222° C. of less than 0.5% by weight per minute.

12. The process of claim 11 in which said anhydride is acetic anhydride and said tertiary amine is pyridine.

References Cited in the file of this patent

UNITED STATES PATENTS

| | | |
|---|---|---|
| 2,768,994 | MacDonald | Oct. 30, 1956 |
| 2,795,571 | Schneider | June 11, 1957 |
| 2,848,437 | Langsdorf et al. | Aug. 19, 1958 |

OTHER REFERENCES

Walker: "Formaldehyde," A. C. S. Monograph #120 (1953), pp. 133–137.